(12) United States Patent
Adachi et al.

(10) Patent No.: US 7,316,482 B2
(45) Date of Patent: Jan. 8, 2008

(54) REFLECTING MIRROR AND PROJECTION IMAGE DISPLAY APPARATUS USING THE SAME

(75) Inventors: Kei Adachi, Yokohama (JP); Sadayuki Nishimura, Yokohama (JP); Koji Hirata, Yokohama (JP); Nobuo Masuoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 284 days.

(21) Appl. No.: 11/063,983

(22) Filed: Feb. 24, 2005

(65) Prior Publication Data

US 2005/0254012 A1    Nov. 17, 2005

(30) Foreign Application Priority Data

May 12, 2004    (JP)    .............................. 2004-141803

(51) Int. Cl.
*G03B 21/22*    (2006.01)

(52) U.S. Cl. ........................... 353/77; 353/37; 359/449; 359/460

(58) Field of Classification Search ...................... None
See application file for complete search history.

(56) References Cited

U.S. PATENT DOCUMENTS

| | | | | |
|---|---|---|---|---|
| 4,009,947 A | * | 3/1977 | Nishida et al. | 359/884 |
| 4,805,989 A | * | 2/1989 | Nakajima | 359/584 |
| 4,921,331 A | * | 5/1990 | Nakajima | 359/584 |
| 4,955,705 A | * | 9/1990 | Nakajima et al. | 359/884 |
| 5,208,620 A | * | 5/1993 | Mitsutake et al. | 353/74 |
| 5,506,642 A | * | 4/1996 | Suzuki et al. | 353/74 |
| 5,613,748 A | * | 3/1997 | Yoshida et al. | 353/74 |
| 5,691,844 A | * | 11/1997 | Oguchi et al. | 359/465 |
| 5,777,804 A | * | 7/1998 | Nakamura et al. | 359/727 |
| 5,829,855 A | * | 11/1998 | Uchiyama | 353/74 |
| 5,896,236 A | * | 4/1999 | Lostumo et al. | 359/847 |
| 5,929,945 A | * | 7/1999 | Negishi et al. | 348/825 |
| 6,059,413 A | * | 5/2000 | Okubo | 353/77 |
| 6,203,162 B1 | * | 3/2001 | Yamashita et al. | 359/883 |
| 6,233,024 B1 | * | 5/2001 | Hiller et al. | 348/744 |
| 6,264,341 B1 | * | 7/2001 | Yamashita et al. | 359/883 |
| 6,565,222 B1 | * | 5/2003 | Ishii et al. | 359/883 |
| 6,574,023 B2 | * | 6/2003 | Matsui et al. | 359/199 |
| 6,650,472 B1 | * | 11/2003 | Adachi et al. | 359/453 |

(Continued)

FOREIGN PATENT DOCUMENTS

JP    09-189803    7/1997

(Continued)

*Primary Examiner*—Patrick Assouad
*Assistant Examiner*—Warren K Fenwick
(74) *Attorney, Agent, or Firm*—Antonelli, Terry, Stout & Kraus, LLP.

(57) ABSTRACT

The present invention is directed to the provision of a reflecting mirror that suppresses decreases in the resolution performance and contrast performance by decreasing the mean surface roughness. In a projection type image display apparatus including a projector lens that expansion projects the image light from an image generating source and a reflecting mirror that guides the image light from the projector lens to the back face of the screen, according to the present invention, a silver reflecting surface (2) is formed on the substrate (1) of the reflecting mirror, a protective layer (3) of a transparent resin is formed thereon, and the mean surface roughness of the silver reflecting layer is made to be 1.8 nm or less.

14 Claims, 5 Drawing Sheets

U.S. PATENT DOCUMENTS

| | | | |
|---|---|---|---|
| 6,695,458 B2 * | 2/2004 | Ohgane et al. | 359/883 |
| RE38,488 E * | 4/2004 | Yamagishi | 348/781 |
| 6,719,432 B2 * | 4/2004 | Chen et al. | 353/74 |
| 6,728,032 B2 * | 4/2004 | Peterson et al. | 359/460 |
| 6,741,825 B2 * | 5/2004 | Omata et al. | 399/309 |
| 6,853,486 B2 * | 2/2005 | Cruz-Uribe et al. | 359/443 |
| 7,033,679 B2 * | 4/2006 | Okura et al. | 428/687 |
| 7,059,730 B2 * | 6/2006 | Masuoka et al. | 353/98 |
| 2004/0246611 A1 * | 12/2004 | Masuoka et al. | 359/884 |

FOREIGN PATENT DOCUMENTS

| | | |
|---|---|---|
| JP | 09-311207 | 12/1997 |
| JP | 2003-255467 | 9/2003 |

\* cited by examiner

REFLECTING MIRROR AND PROJECTION IMAGE DISPLAY APPARATUS USING THE SAME

CLAIM OF PRIORITY

The present application claims priority from Japanese Application serial no. JP 2004-141803 field on May 12, 2004, the content of which is hereby incorporated by reference into this application.

BACKGROUND OF THE INVENTION (1) Field of the Invention

The present invention relates to a reflecting mirror for guiding image light expansion-projected by a projector lens to the back face of a screen, and to a projection type image display apparatus using the reflecting mirror.

(2) Description of the Related Art

A projection type image display apparatus utilizes a reflecting mirror for the downsizing of the set; the reflecting mirror involves reflecting image light from an image generating source such as a CRT, or a liquid crystal panel for changing the light path, and then guiding the image light to the back face of a transmission screen. The metal reflection film (metal reflection layer) of the reflecting mirror conventionally uses aluminum (Al); however, a metal reflection film is also proposed which employs silver (Ag) having little dependency of the reflection factor on the wavelength, as will be shown in the following three patent documents.

Japanese Patent Laid-open No. 2003-255467 below discloses formation of a silver reflection film on a glass substrate using a spray apparatus by silver mirror reaction. Japanese Patent Laid-open Nos. 9-189803 and 9-311207 disclose formation of a silver thin film on a substrate made of resin such as acrylic by vapor deposition.

SUMMARY OF THE INVENTION

The three patent documents above each disclose the formation of a silver reflection surface on a substrate as a metal reflection film (layer), but no consideration is given to the surface roughness of the silver reflection surface. Here, the term "surface roughness" means minute bumps and dips formed on the silver reflection surface; the bumps and dips are formed attributable to the crystal of the metal deposited when the reflection surface is formed on the substrate. The size of the surface roughness is normally expressed in terms of the "mean surface roughness," the mean of heights of the bumps and dips per predetermined area. Thus, the "surface roughness" is hereinafter called the "mean surface roughness." The mean surface roughness on a silver reflection surface affects the contrast of an image displayed on a transmission screen.

When the mean surface roughness is small (i.e., the flatness of the silver reflection surface is high), most of the incident light of the reflecting mirror is regularly reflected, so the light image incident on the reflecting mirror from an image-generating source is suitably image-formed on the transmission screen. However, when the mean surface roughness is large (i.e., the flatness of the silver reflection surface is low), the percentage of the incident light scatter-reflected (diffused reflected) by the bumps and dips is increased. Most of the scatter-reflected light is not image-formed on the transmission screen, thereby decreasing the resolution performance and contrast performance of the projection type image display apparatus. Hence, for the improvement of the resolution performance and contrast performance of the projection type image display apparatus, it is important to make the surface roughness of the silver reflection film of the above reflecting mirror as small as possible for the suppression of an increase in the above scatter reflection.

Additionally, Japanese Patent Laid-open Nos. 9-189803 and 9-311207 above also propose a construction that involves vapor depositing a silver reflection film on a substrate in the formation of the silver reflection film on the substrate. The reflecting mirror to be used in a projection type image display apparatus, however, is large in size; for example, when the image plane size is 50 inches, the maximum width of the reflecting mirror is about 1 meter. A film forming apparatus (e.g., sputtering apparatus) forming a reflecting film on such a large substrate is large in size and expensive. Furthermore, film formation by vacuum deposition or vacuum sputtering requires time for production of a high vacuum state and the working efficiency is low, and thus the reflecting mirror price is extremely expensive as well.

The present invention has been made taking into account the above situation, and it is an object of the invention is to provide a reflecting mirror suitable for the suppression of decreases in the resolution performance and in contrast performance of a projection type image display apparatus, and a projection type image display apparatus using the reflecting mirror. Also, another object of the present invention is to make it possible to inexpensively produce such a reflecting mirror.

For attainment of the above object, features of the present invention are to use a unit having a silver reflection layer on the substrate thereof as a reflecting mirror that reflects image light from the projector lens and then guides the image light to the back face of a transmission screen, and also to set the mean surface roughness of the silver reflection layer to 1.8 nm or less. More specifically, the present invention sets the mean surface roughness in the predetermined area of the silver reflection layer to 1.8 nm or less to suitably suppress the above scatter reflection (diffused reflection). This mean surface roughness is associated with each value measured in specified regions of at least 9 sites: the central portion, four corners, and four intermediate portions intermediately located at the four corners, of the silver reflection surface of the above reflecting mirror. In other words, when the mean value of the arithmetical mean roughness values of the respective values at these nine sites is 1.8 nm or less, the mean surface roughness of the entire surface of the reflecting mirror can be considered to be 1.8 nm or less.

Further, to attain the other object as above, the present invention forms a silver reflecting layer by a spray method using silver mirror reaction so that it has a mean surface roughness of 1.8 nm or less.

Moreover, on the silver reflection surface may be formed a protective layer composed of a transparent resin and also glass may be used as the above substrate. As an image generating source of a projection type image display apparatus according to the present invention may be used three projection tubes, each generating image light of red, blue and green; a pixel selection type display device may also be used that forms a light image by strength modulating the light from light source according to image signals.

The present invention can suppress decreases in the resolution performance of a projection type image display apparatus and in contrast performance.

DETAILED DESCRIPTION OF THE PREFERRED EMBODIMENTS

Figure 1:
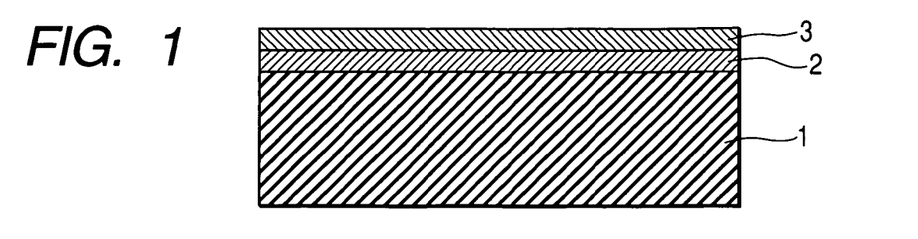
FIG. 1 is a sectional view of a reflecting mirror according to an embodiment of the present invention.

Embodiments of the present invention will hereinafter be set forth in detail with reference to drawings. FIG. 1 is a sectional view of a reflecting mirror according to one embodiment of the present invention. As shown in FIG. 1, the reflecting mirror comprises a substrate 1 having a flat surface, a reflecting film (layer) 2 formed on the flat substrate surface, and a protective film (layer) 3 that covers the surface of the reflecting film to prevent the corrosion of the reflecting film. Here, the substrate 1 uses glass; the reflecting film (layer) 2 is formed on the substrate by the spray method that makes use of the silver mirror reaction.

Figures 7A, 7B, 8:
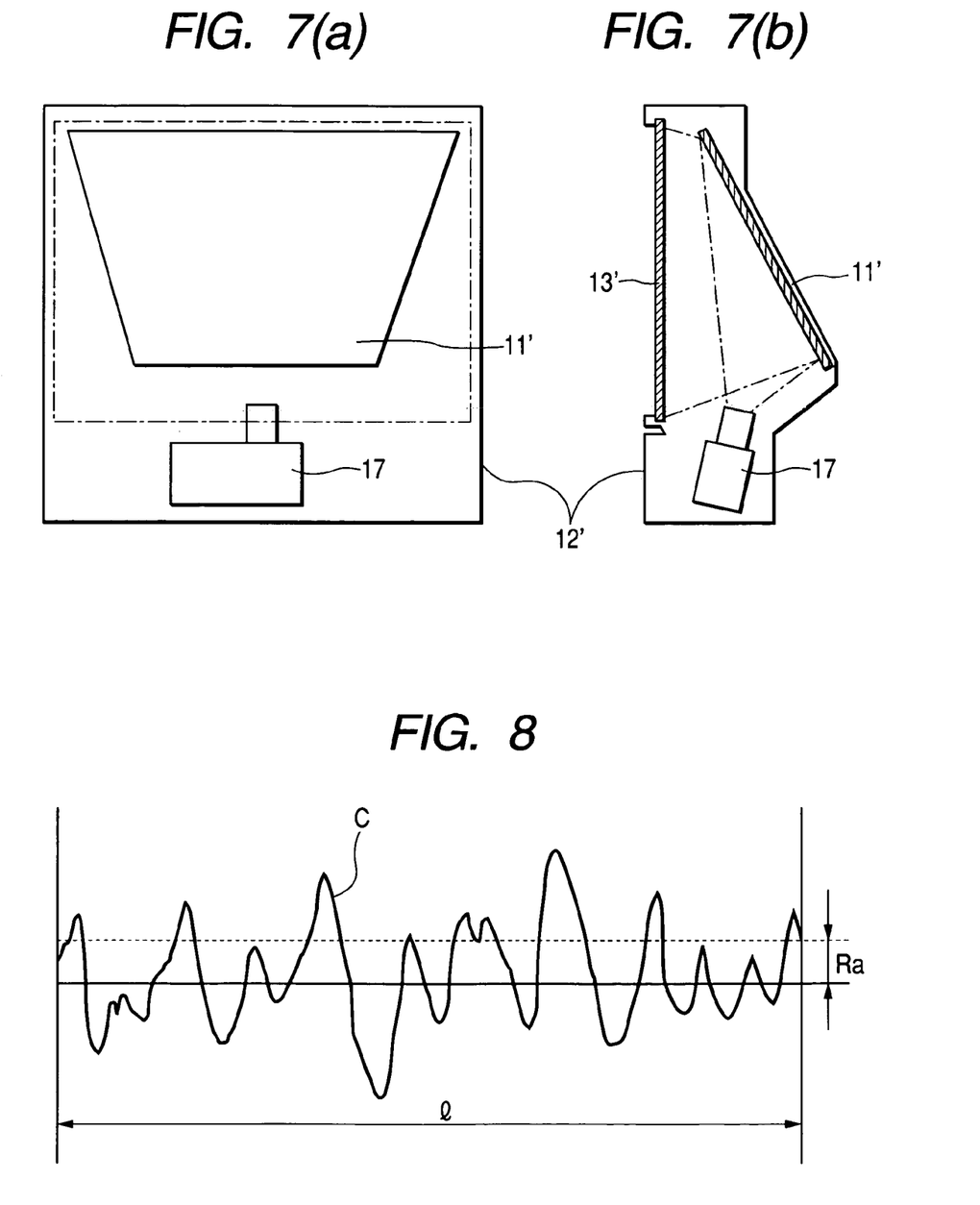
FIGS. 7A and 7B are front and side views, respectively, of another projection type image display apparatus provided with a reflecting mirror of the present invention.
FIG. 8 is a diagram for describing the mean surface roughness.

The term "surface roughness" described below stands for minute bumps and dips formed on the silver reflection surface; the bumps and dips are formed attributable to the crystal of the metal deposited when the reflection surface is formed on the substrate. This crystal size varies depending on chemical conditions of chemical materials (reagent solution, etc.) used in the formation of a reflecting film, and ambient environment conditions such as temperature and humidity, and the like. The term "mean surface roughness" refers to the mean of the above surface roughness in a specified measurement region (e.g., 15 mm square) and is also called the arithmetical mean roughness. The arithmetical mean roughness, as indicated in FIG. 8 for example, is a value that is evaluated by extracting the standard length 1 from the roughness curve (c) obtained by a surface roughness shape measuring device in the direction of the average line of the curve, totaling the absolute values of the deviations from the average line of the extracted portion to the measured curve, and then averaging the total value. The arithmetical mean roughness thus obtained is expressed in terms of Ra in FIG. 8.

Optical properties necessary for a reflecting mirror used in a projection type image display apparatus include the resolution performance and contrast performance of an image projected on a screen as well as the reflectivity (reflectance). A factor that affects this resolution performance and contrast performance is scattering of light when image light is reflected on a reflecting mirror. An increase in scattering of reflected light scatters light, whereby images on different spots overlap, leading to decreases in the resolution performance and contrast performance of the projection type image display apparatus due to halation.

As described supra, when the performance of a reflecting mirror is evaluated, its resolution performance and contrast performance need to be evaluated. A reflecting mirror alone, however, cannot be evaluated for those factors. Accordingly, those are evaluated only after the reflecting mirror has been installed in a projection type image display apparatus. Thus, by determination of the light scattering that affects the resolution performance and contrast performance, were evaluated the resolution performance and contrast performance of a reflecting mirror.

Next, a method for determining the scattering of light will be described infra. The determination makes use of a spectrophotometer. The light having a radiation area of (a) is directed to a reflecting mirror and its reflected light is directed to an integrating sphere to determine the scattering. At this time, if the reflecting mirror has no scattering at all, the area of the incident light to the integrating sphere should also be (a) However, since scattering occurs on the reflecting mirror, the area of the incident light to the integrating sphere becomes larger than (a). Here, a slit is placed prior to the integrating sphere on the light path and the slit area is made to be 1.5, 2, 3, and 4 times the area (a) to determine the amount of light directed to the integrating sphere. If the amount of light directed to the integrating sphere is decreased when a slit is placed, the decreased amount is thought to be that of scattering. Here, the amount of light directed to the integrating sphere without placing a slit (the amount of light reflected from the mirror) is set to 100%; the decreased amount of the amount of light directed to the integrating sphere when a slit is placed is the amount of scattering. Also, the light used for the determination has a wavelength of 550 nm.

Figure 5:
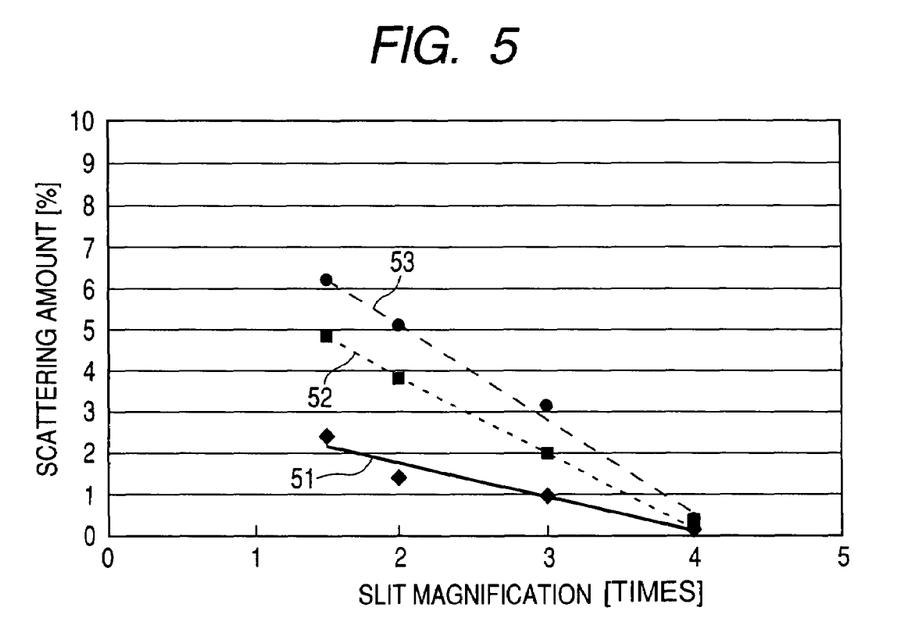
FIG. 5 is a property diagram of the scattering of each reflecting mirror.

FIG. 5 shows scattering amounts 51, 52 and 53 of reflecting mirrors of the present invention and an aluminum mirror with a conventional reflection increasing coat for comparison. The scattering amount 51 indicated in FIG. 5 shows the scattering amount of an aluminum mirror with a conventional reflection-increasing coat. The scattering amount 52 is a scattering amount of a reflecting mirror having contrast performance equivalent to an aluminum mirror with a reflection increasing coat, and indicates a scattering amount when the reflecting mirror is installed in a projection type image display apparatus. The scattering amount 53 is a scattering amount of a reflecting mirror, the contrast performance of which is 5% decreased relative to the contrast performance of an aluminum mirror with a reflection increasing coat. In addition, the scattering amount 53 indicates a scattering amount when the reflecting mirror is installed in a projection type image display apparatus.

The results in FIG. 5 can confirm that as a reflecting mirror decreases in contrast performance, the scattering amount is increased. Also, when the reflecting mirrors are installed in the projection type image display apparatuses, a difference can also be confirmed between the aluminum mirror 51 with the reflection-increasing coat and the reflecting mirror 52, which have the equivalent contrast performance. More specifically, it is probable that the use of this method of determining a scattering amount makes it possible to measure more detail optical properties than the use of the contrast measuring method that actually installs the light reflecting mirror in the projection type image display apparatus.

For the confirmation of the reason why the scattering amounts differ although the apparatuses have the same contrast when the light reflecting mirrors are installed in the projection type image display apparatuses, the surface roughness values of the respective mirrors were determined. Table 1 shows the surface roughness values of the respective reflecting mirrors.

TABLE 1

| Kinds of Reflecting Mirrors | Surface Roughness |
|---|---|
| (1) Conventional aluminum mirror with a reflection increasing coat | 1.4 nm |
| (2) Reflecting mirror of the present invention: product equivalent in contrast to (1) | 1.8 nm |
| (3) Reflecting mirror of the present invention: product 5% decreased in contrast relative to (1) | 2.1 nm |

FIG. 5 and Table 1 show that as the mean surface roughness is increased, the scattering amount is increased, leading to a decrease in contrast. More specifically, understandably, the mean surface roughness needs to be 1.8 nm or less for the obtainment of contrast performance equivalent to that of the conventional aluminum mirror with a reflection increasing coat. The present inventors have found that the mirror surface roughness needs to be 1.8 nm or less for the obtainment of good resolution performance and contrast performance from the results of such measurements, experiments and investigations about the reflecting mirrors.

Figure 9:
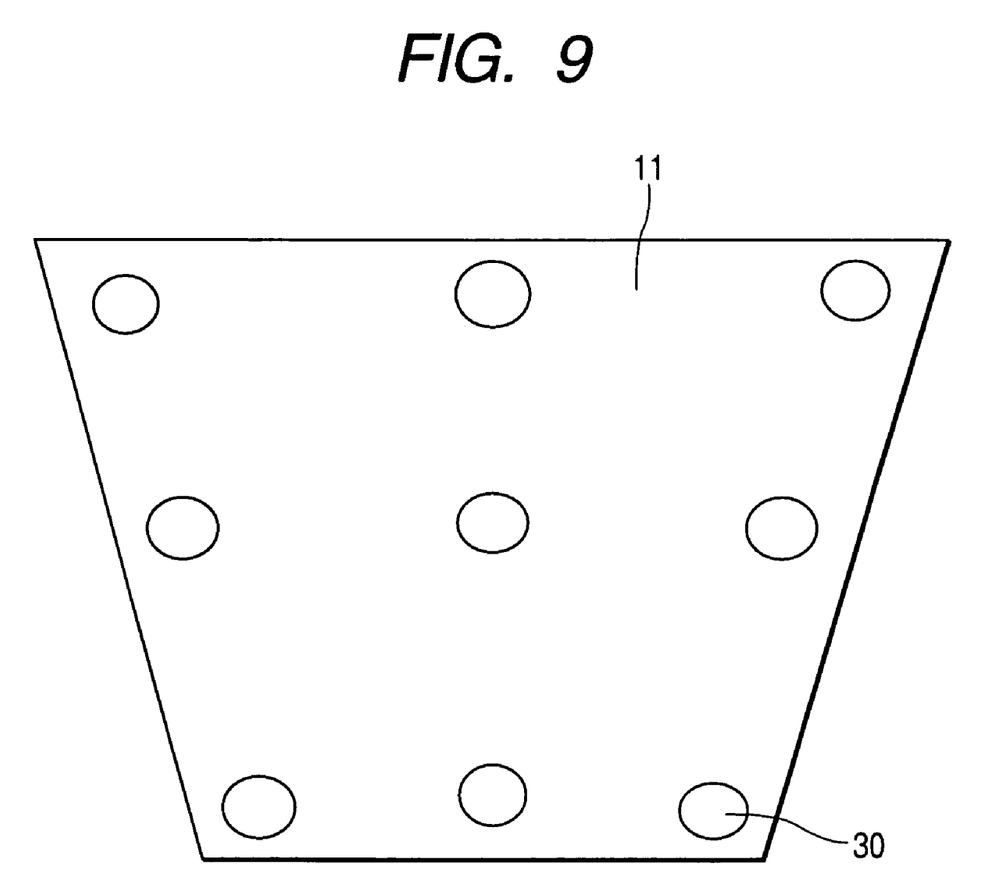
FIG. 9 is a diagram indicating measurement sites for the mean surface roughness of a reflecting mirror in the present embodiment.

Now, the method of determining the mean surface roughness will be set forth. The present embodiment used, for example, Surftest SV-300 available from Mitutoyo Corp. as a surface roughness shape measuring apparatus. Measuring conditions included a standard length of 0.08 mm, the interval number of 5, a λc value of 0.08 mm, a filter type of Gaussian, and an evaluation length of 0.4 mm. Under these conditions, the determination of bumps and dips was carried out by tracing a reflecting mirror in a constant direction or in a plurality of directions by means of the tracer of the above measuring apparatus. As illustrated in FIG. 9, in the present embodiment, the measuring sites 30 of the reflecting mirror 12 included at least 9 sites: the central portion, the four corners, and the four intermediate portions intermediately located at the four corners, of the silver reflection surface of the above reflecting mirror. A region having an area of 15 mm square was given to each of these 9 sites as a measuring region and the mean surface roughness was determined as described supra in respective measuring regions. When the mean value of the mean roughness in these 9 sites is 1.8 nm or less, the mean surface roughness of the entire surface of the reflecting mirror is considered to be about 1.8 nm or less.

Figure 2A:
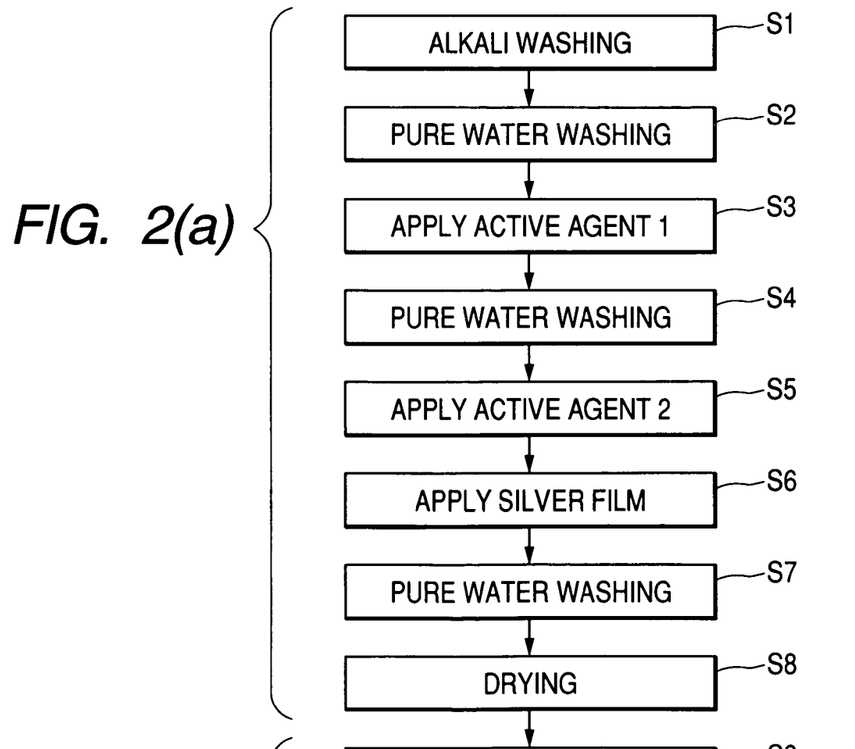
FIGS. 2(a) and 2(b) are flow charts indicating steps of producing a reflecting mirror according to an embodiment of the present invention.
Figure 2B:
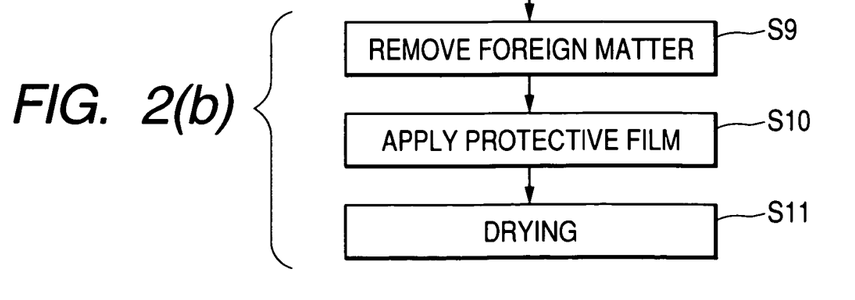

Next, a method of manufacturing a reflecting mirror will be described; the reflecting mirror has a reflecting surface with a small mean surface roughness as mentioned supra. FIGS. 2(a) and 2(b) are a process diagram. First of all, a reflecting film (layer) applying process FIG. 2(a) will be set forth.

First, the surface of a substrate 1 is sufficiently washed with an alkaline detergent (Step S1). This is directed to the degreasing of an applied surface and the removal of cullet in the substrate cutting out.

Then, pure water washing for removing the alkaline detergent is performed by washing the surface of the substrate 1 by use of ion exchanged water or distilled water (Step S2). The pure water for washing preferably has an electric conductivity of 1 μS/cm or less; after the pure water washing step, water droplets adhered on the surface of the substrate 1 are blown off by air blow.

Thereafter, a pretreatment active agent 1 containing a catalyst is applied to the surface of the substrate 1 (Step S3) as pretreatment that forms a reflecting film (layer) 2 to carry the catalyst on the surface of the substrate 1. The catalyst carried on the substrate 1 becomes a starting core of reactive deposition of silver and is a sensitizer used for readily depositing the reflecting film 2. The catalyst makes use of an aqueous hydrochloric acid solution of stannic chloride and iron chloride. This pretreatment active agent 1 is preferably adjusted to pH 2 or less. Subsequently, the surface of the substrate 1 is washed using ion exchanged water or distilled water (Step S4) to remove the above active agent 1 that has not been carried on the surface of the substrate 1. Then, an aqueous silver solution (active agent 2) is applied to the surface of the substrate 1 (Step S5) to deposit the silver that is a starting core. The active agent 2 utilizes an aqueous silver nitrate solution.

After these preprocessing steps are performed, a silver film applying step (Step S6) is carried out that laminates the reflecting film (layer) 2 on the substrate 1. The method involves simultaneously applying an aqueous ammoniacal silver nitrate solution and an aqueous reducing agent solution on the preprocessed surface of the substrate, and then allowing the silver to deposit mainly on the starting core on the substrate 1 by silver mirror reaction and to laminate to form the reflecting film 2. The aqueous ammoniacal silver nitrate solution is adjusted to have a pH value of from 10 to 13, preferably from 11 to 12. The above aqueous reducing agent solution suitably utilizes an aqueous hydrazine sulfate solution. Also, the above aqueous reducing agent solution preferably has a pH value of from 8 to 12; the pH of this reducing agent greatly affects the crystal size of the reflecting film 2. The pH of this reducing agent will be described in detail infra.

Thereafter, the surface of the substrate 1 is washed using ion exchanged water or distilled water (Step S7), the aqueous ammoniacal silver nitrate solution and the aqueous reducing agent solution, after silver mirror reaction, remaining on the surface of the substrate 1 are removed. Then, the water droplets adhered on the surface of the reflecting film 2 are blown off by air blow. Then, a drying step is carried out that dries the reflecting film 2 of the substrate 1 (Step S8). The drying is performed at a temperature of 70° C. for 20 minutes.

Next, a protective film (layer) manufacturing process FIG. 2(b) will be described. The protective film manufacturing process FIG. 2(b) is a process that laminates the protective film (layer) 3 on the silver reflecting film (layer) 2. The surface of the dried reflecting film 2 is blown by air blow, that is, a foreign matter-removing step (Step S9) is carried out that blows off the surface deposit of the reflecting film 2. If surface deposit remains on the surface, the protecting film is not sufficiently laminated, leading to a decrease in corrosion resistance of the mirror for a projection type image display apparatus. Then, a protective film applying step (Step S10) is performed that involves applying a protective film agent to the reflecting film 2, and then laminating a protecting film 3 thereon. Examples of this protective film agent that is suitably used include colorless, transparent protective film agents such as silicone acrylic resins, and silicone urethane resins.

Finally, a drying step (Step S11) of drying the protective film agent applied to the surface of the reflecting film 2 is performed to form the protective film 3. For instance, the drying is carried out at 80° C. for 30 minutes when a silicon acrylic resin is used as the above protective film agent.

Figure 3:
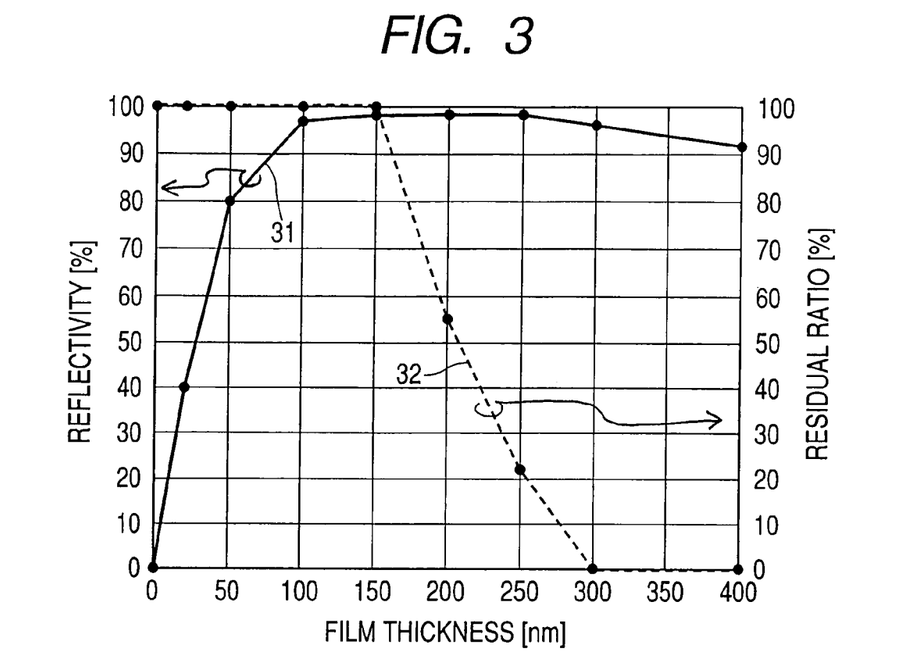
FIG. 3 is a property diagram of the adhesion and reflectivity (reflectance) of a silver reflection film (layer) for the film thickness thereof.

The reflecting film (layer) 2 will be set forth in detail infra; the film is a reflecting mirror that uses silver for the metal reflecting film. FIG. 3 shows the reflectivity (reflectance) plotted versus the thickness of the reflecting film 2, and the residual ratio of the reflecting film when the tape test (JIS H 8504), a film adhesion test generally used, was carried out. The residual ratio is defined as a ratio of squares remaining without removal from the reflecting film 2 to the total squares of the reflecting film. More specifically, the total squares is 100 squares formed of 10 squares for the length by the 10 square of the width, which are obtained by giving 1 mm pitch breaks to the reflecting film 2. A Scotch adhesive tape stipulated by JIS Z 1522 is adhered on such a reflecting film 2 and the tape is rapidly and strongly torn off. Thus, the squares remaining without removal can be obtained. In FIG. 3, reference numeral 31 is the reflectivity (reflectance) of the reflecting film 2 and reference numeral 32 is the residual ratio after the tape testing. More specifically, the larger the residual ratio, the stronger the adhesion of the reflecting film 2 to the substrate. Additionally, the determination of the reflectivity (reflectance) uses green light having a wavelength of 550 nm. FIG. 3 clearly indicates that the residual ratio after the tape testing is reduced from near 150 nm to half near 200 nm. Also, the reflectivity is increased with proportionally increasing film thickness; the reflectivity levels off at about 100 nm and is decreased at 300 nm or more. This suggests that the thickness of the metal thin film is suitably from 100 to 200 nm. In particular, the film thickness is desirable in the proximity of 150 nm.

Figure 4:
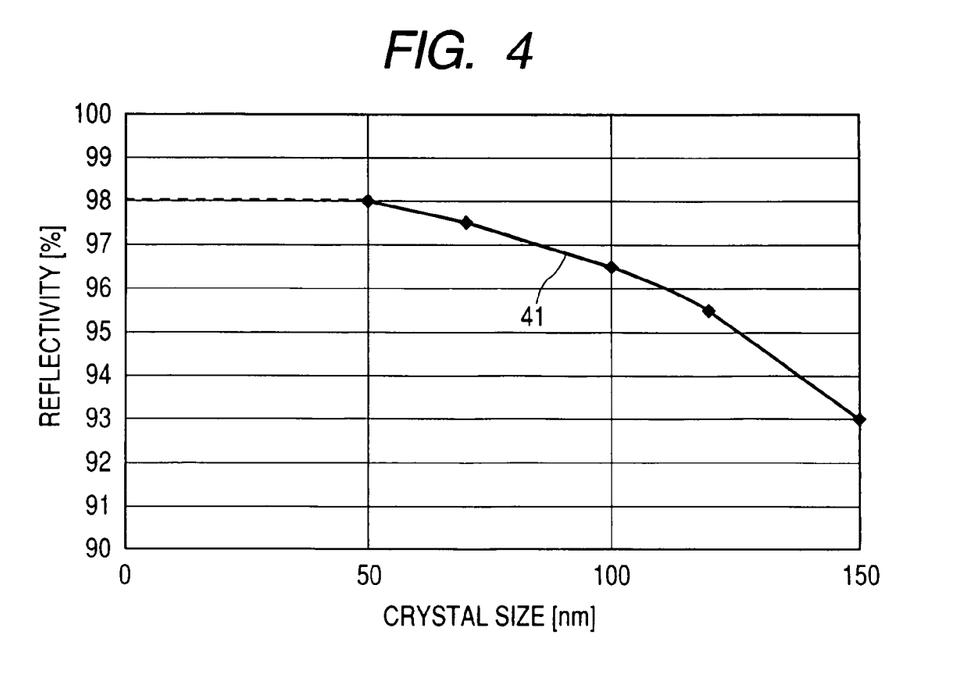
FIG. 4 is a property diagram of the reflectivity (reflectance) versus the crystal size of a silver reflection film (layer)

FIG. 4 indicates the relationship between the crystal size and reflectivity (reflectance) of the reflecting film (layer) 2. The thickness of the reflecting film 2 is made to be 150 nm; the reflectivity determination makes use of light having a wavelength of 550 nm. FIG. 4 shows that the smaller the crystal size of the reflecting film 2, the better the reflectivity. Crystal having a size of 50 nm has the maximum reflectivity of the silver. This suggests that the crystal size of the reflective film 2 is desirably 100 nm or less, particularly desirably 50 nm or less.

Also, the crystal size of the reflecting film 2 is shown to be determined by the film-forming rate of the reflecting film 2. When the reflecting film is formed fast, the crystal size of the reflecting film 2 is small. The rate of formation of the reflecting film 2 can be regulated by the pH of a reducing agent and the liquid temperature.

If a reducing agent has a low temperature, the silver hardly deposits due to a slow reaction; if the temperature is high, the deposition rate of the silver is too fast, resulting in fogging on the reflecting film 2. The liquid temperature giving a high reflectivity is 25±5° C.; in this range changes in reaction rate are hardly seen.

On the other hand, the pH of the reducing agent is proportional to the reaction rate of the silver, whereby the deposition of the silver is suitably controllable. When the pH is large, the reaction rate is fast; too large a pH generates fog, thereby lowering the reflectivity. In contrast to this, if the pH is low, the reaction rate is slow, making it impossible to gain a high reflectivity due to being incapable of ensuring a sufficient film thickness. The pH of the reducing agent is suitably from 8 to 12, desirably from 9 to 11, which can suitably deposit the silver. The control of the other aqueous solutions by pH makes easy the regulation of the silver deposition. As described supra, by control of the pH of each of the solutions, the reflecting film 2 having a mean surface roughness can be fabricated.

Figure 6A:
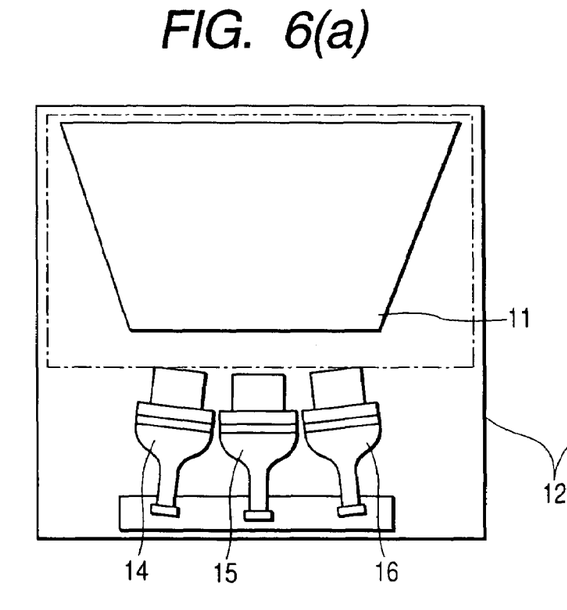
FIGS. 6A and 6B are front and side views, respectively, of a projection type image display apparatus provided with a reflecting mirror of the present invention.
Figure 6B:
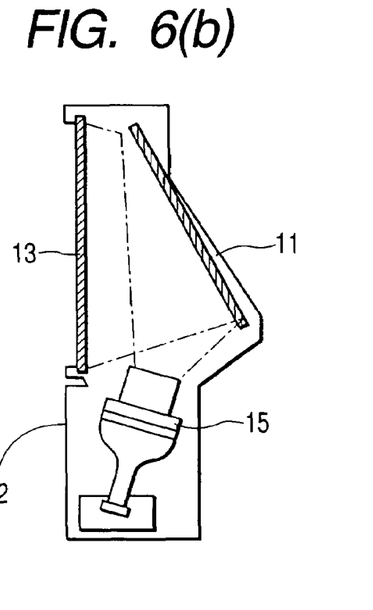

Next, a projection type image display apparatus will be described that installs the above reflecting mirror of the present invention. FIGS. 6A and 6B are a front view and side views, respectively, of the projection type image display apparatus. As indicated in the figures, an apparatus is shown that uses each projection tube for image light of red, green and blue as image generating sources. Within a case 12, are housed a projection tube 14 for red image light projection, a projection tube 15 for green image light projection, a projection tube 16 for blue image light projection, and a reflecting mirror 11. In the front of the case 12, a transmission screen 13 is fixedly placed. Red image light, green image light and blue image light emitted from the respective projection tubes 14 to 16 are expansion projected by projection lenses placed in the fronts of the respective projection tubes 14 to 16, and then are directed to the reflecting mirror 11. The reflecting mirror 11 changes the light path by reflecting the amplified image light from the projection lenses, and guides the image light to the back face of the above screen 13. This forms an image in front of the screen 13.

FIGS. 7A and 7B are a front and side views, respectively, of another projection type image display apparatus provided with a reflecting mirror 11' of the present invention. FIGS. 7A and 7B indicate an example having a lamp (not shown, light source) as an image generating source, indicator elements such as a liquid crystal panel that forms a light image by light-strength modulating the light from the lamp in response to an image signal, and the like. Also, an example in FIG. 7B is provided with an optical unit 17 that expansion projecting a light image on an indicator element onto a screen 13' by means of a projection lens (not shown).

As described supra, the present invention can suppress decreases in the resolution performance and contrast performance of a projection type image display apparatus, or improve the resolution performance and contrast performance since the mean surface roughness of the silver reflecting layer is made small, at as small as 1.8 nm. Also, the present invention can inexpensively produce the silver reflecting layer of a reflecting mirror because of being capable of forming the layer by means of the spray method utilizing the silver mirror reaction. Additionally, the control of the reaction rate of the silver deposition, i.e., the control of the pH and liquid temperature of the aqueous reducing agent solution makes it possible to decrease the crystal size of the reflecting layer, leading to be capable of causing the surface roughness to be 1.8 nm or less. Accordingly, the present invention can suppress scattering reflection on the reflecting surface of the reflecting mirror and can also ensure the resolution performance and contrast performance.

What is claimed is:

1. A projection type image display apparatus, comprising:
   a screen;
   an image generating source;
   a projector lens for expansion-projecting image light from the image generating source; and
   a reflecting mirror for reflecting the image light from the projector lens and then guiding the light to a back face of the screen;
   wherein the reflecting mirror has a silver reflecting layer formed on the reflecting surface; and wherein the silver reflecting layer has a mean surface roughness of 1.8 nm or less.

2. A projection type image display apparatus, comprising:
a screen;
an image generating source;
a projector lens for expansion-projecting image light from the image generating source; and
a reflecting mirror for reflecting the image light from the projector lens and then guiding the light to a back face of the screen;
wherein the reflecting mirror comprises a substrate, a silver reflecting layer formed on the substrate, and a transparent resin layer formed on the silver reflecting layer; and
wherein the silver reflecting layer has a mean surface roughness of 1.8 nm or less.

3. A projection type image display apparatus according to claim 2,
wherein the substrate is a glass substrate; and
wherein the silver reflecting layer is formed on the glass substrate by plating.

4. A projection type image display apparatus according to claim 2,
wherein the surface roughness of the silver reflecting surface is expressed in terms of an arithmetical mean roughness within a specified region on the silver reflecting surface of the reflecting mirror.

5. A projection type image display apparatus according to claim 4,
wherein the specified region comprises at least 9 sites: a central portion, four corners, and four intermediate portions intermediately located at the four corners, of the silver reflection surface of the reflecting mirror.

6. A projection type image display apparatus according to claim 2,
wherein the image generating source comprises a red projection tube for generating red image light, a blue projection tube for generating blue image light, and a green projection tube for generating green image light.

7. A projection type image display apparatus according to claim 2,
wherein the image generating source comprises a pixel selecting type indicator element which strength modulates light from a light source in response to an image signal to form a light image.

8. A reflecting mirror which is used for a projection type image display apparatus that amplifies image light from an image generating source by means of a projector lens and projects the image light to a back face of a transmission screen to display the image on the transmission screen, and which is used for guiding the image light from the projector lens to the transmission screen by reflecting the image light for changing the light path,
wherein the reflecting mirror comprises a substrate, a silver reflecting layer formed on the substrate, and a transparent resin layer formed on the silver-reflecting layer; and
wherein the silver reflecting layer has a mean surface roughness of 1.8 nm or less.

9. A reflecting mirror according to claim 8,
wherein a crystal size of the silver reflecting layer is 100 nm or less.

10. A reflecting mirror according to claim 8,
wherein the substrate is a glass substrate; and
wherein the silver-reflecting layer is formed on the glass substrate by plating.

11. A reflecting mirror according to claim 8,
wherein the surface roughness of the silver reflecting surface is expressed in terms of an arithmetical mean roughness within a specified region on the silver reflecting surface of the reflecting mirror.

12. A reflecting mirror according to claim 11,
wherein the specified region comprises at least 9 sites: a central portion, four corners, and four intermediate portions intermediately located at the four corners, of the silver reflection surface of the reflecting mirror.

13. A reflecting mirror according to claim 8,
wherein the image light from the image generating source is image light having the three primary colors of red, blue and green emitted from a projection tube.

14. A projection type image display apparatus according to claim 8,
wherein the image light from the image generating source is light strength-amplified in response to an image signal, from a light source.

* * * * *